United States Patent

Silverman

[11] Patent Number: 6,035,031
[45] Date of Patent: Mar. 7, 2000

[54] METHOD AND APPARATUS AUTOMATIC CALL-BACK

[75] Inventor: David Phillip Silverman, Somerville, N.J.

[73] Assignee: AT&T Corp, New York, N.Y.

[21] Appl. No.: 09/001,975

[22] Filed: Dec. 31, 1997

[51] Int. Cl.[7] .................................................. H04M 3/42
[52] U.S. Cl. .......................................... 379/209; 379/442
[58] Field of Search ................................. 379/209, 207, 379/214, 216, 265, 266, 309, 211, 355, 356, 441, 442

[56] References Cited

U.S. PATENT DOCUMENTS

| | | | |
|---|---|---|---|
| 5,040,208 | 8/1991 | Jolissaint | 379/209 |
| 5,155,761 | 10/1992 | Hammond | 379/88.2 |
| 5,185,782 | 2/1993 | Srinivasan | 379/214 |
| 5,311,574 | 5/1994 | Livanos | 379/266 |
| 5,311,583 | 5/1994 | Friedes et al. | 379/266 |
| 5,425,091 | 6/1995 | Josephs | 379/88.2 |
| 5,533,100 | 7/1996 | Bass et al. | 379/209 |
| 5,577,111 | 11/1996 | Iida et al. | 379/209 |
| 5,625,682 | 4/1997 | Gray et al. | 379/266 |
| 5,627,875 | 5/1997 | Kapsales | 379/211 |
| 5,692,033 | 11/1997 | Farris | 379/265 |
| 5,761,289 | 6/1998 | Keshav | 379/209 |
| 5,768,359 | 6/1998 | DiPierro, Jr. et al. | 379/209 |
| 5,802,160 | 9/1998 | Kugell et al. | 379/211 |
| 5,903,642 | 5/1999 | Schwartz et al. | 379/209 |
| 5,943,409 | 8/1999 | Malik | 379/209 |

*Primary Examiner*—Scott Wolinsky

[57] ABSTRACT

An automatic call-back device notifies a subscriber when a called party's telephone station is no longer busy. When the subscriber calls a called party and the called party's telephone station is busy, the automatic call-back device offers the subscriber call-back options for calling the subscriber when the called party's telephone station is no longer busy. If selected, the automatic call-back device monitors the called party's telephone station for an on-hook signal, for example. When the called party goes on-hook, the automatic call-back device calls the called party and the subscriber and connects the subscriber and the called party in a call. If multiple subscribers call the same called party, the automatic call-back device stores an identifier corresponding to each subscriber in a call-back list based on when each subscriber called the called party. When the called party goes on-hook, the automatic call-back device contacts the first subscriber in the call-back list (i.e., the subscriber that called first). If this subscriber cannot be reached, then the automatic call-back device calls the next subscriber in the call-back list and so on until one of the calling subscribers is connected with the called party or the call-back list is exhausted.

26 Claims, 6 Drawing Sheets

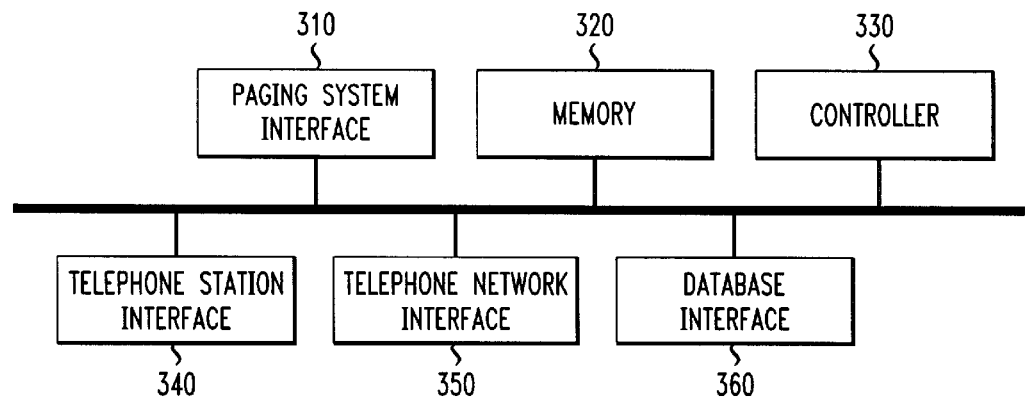

METHOD AND APPARATUS AUTOMATIC CALL-BACK

BACKGROUND OF THE INVENTION

1. Field of Invention

The invention relates to a method and apparatus for an automatic call-back system that automatically notifies a subscriber that called parties are no longer busy and asks if the subscriber would like to place another call to the called party.

2. Description of Related Art

Conventional telephone systems, provide a call-back feature to automatically call a busy telephone station of a called party when the called party's telephone line is no longer busy. If the called party's telephone line is busy when called, the caller may press "*66" using the telephone key pad to direct the telephone system to automatically call the called party when the called party's telephone line is not busy. The caller receives a "special ring" when the called party's telephone line is not busy and if answered, the called party is automatically called and connected to the caller.

While an improvement, the above call-back feature does not provide the caller any options to account for the many situations that the caller may be in when the called party's telephone line becomes not-busy. Thus, new technology is needed to further assist the caller in the above circumstances.

SUMMARY OF THE INVENTION

An automatic call-back device notifies a subscriber when a called party's telephone station is no longer busy. When the subscriber calls a called party and the called party's telephone station is busy, the automatic call-back device offers the subscriber call-back options for calling the subscriber when the called party's telephone station is no longer busy. If selected, the automatic call-back device monitors the called party's telephone station for an on-hook signal, for example. When the called party goes on-hook, the automatic call-back device calls the called party and the subscriber and connects the subscriber and the called party in a call.

If multiple subscribers call the same called party, the automatic call-back device stores an identifier corresponding to each subscriber in a call-back list based on when each subscriber called the called party. When the called party goes on-hook, the automatic call-back device contacts the first subscriber in the call-back list (i.e., the subscriber that called first). If this subscriber cannot be reached, then the automatic call-back device calls the next subscriber in the call-back list and so on until one of the calling subscribers is connected with the called party or the call-back list is exhausted.

BRIEF DESCRIPTION OF THE DRAWINGS

The invention is described in detail with reference to the following drawings, wherein like numerals represent like elements, and wherein:

FIG. 3 is a block diagram of the automatic call-back device;

FIG. 4 is a diagram illustrating a sample subscriber profile information for the automatic call-back device;

FIG. 5 is a diagram illustrating a sample of a called party's automatic call-back list for the automatic call-back device;

DETAILED DESCRIPTION OF PREFERRED EMBODIMENTS

Figure 1:
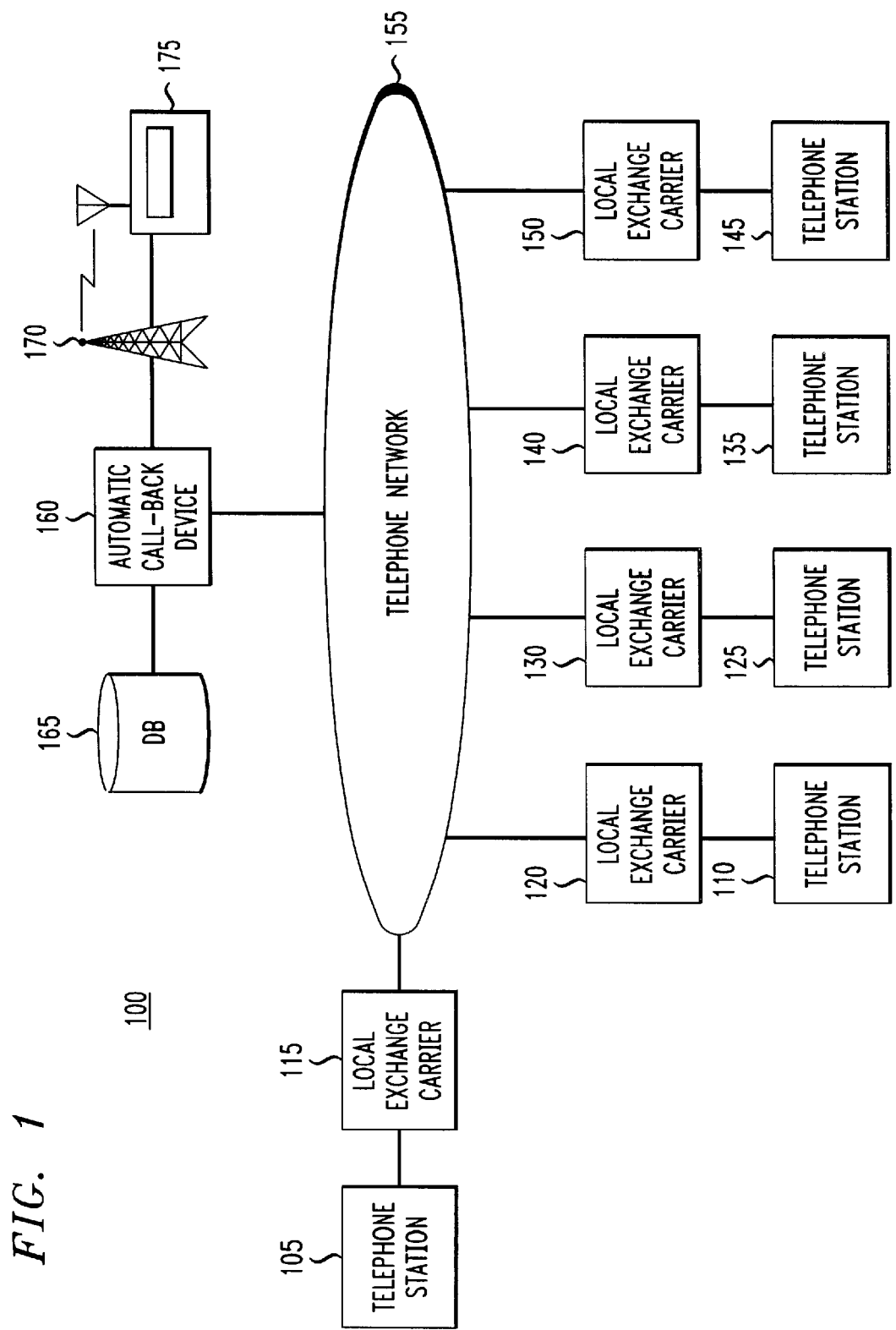
FIG. 1 is a block diagram of an exemplary automatic call-back system.

FIG. 1 shows an exemplary embodiment of an automatic call-back system 100 that includes a telephone network 155 connected to several telephone stations 105, 110, 125, 135, and 145 via local exchange carriers 115, 120, 130, 140, and 150, respectively. The local exchange carriers 115, 120, 130, 140 and 150 include well known switching technologies for connecting and routing calls (i.e., the Lucent 5ESS, etc.). The telephone stations 105, 110, 125, 135, 145 may also be personal computers, or any other device which may send and receive communications. The telephone network 155 is also connected to an automatic call-back device 160.

The automatic call-back device 160 is connected to a database 165. The database 165 may be any memory device internal or external to the automatic call-back device 160. The automatic call-back device 160 is coupled to a wireless communications tower, such as a mobile base station for cellular phones which provides broadcasting capabilities or a pager tower 170 to wirelessly communicate with portable communication devices, such as a pager 175.

When a subscriber of the automatic call-back system, using telephone station 105, attempts to call a called party at telephone station 125, the call is routed through the local exchange carrier 115 through the telephone network 155 (i.e., 5ESS) to the automatic call-back device 160. If the called party's telephone station 125 is busy (e.g., off-hook), the automatic call-back device 160 queries whether the subscriber wishes to be called back when the called party's telephone station 125 is no longer busy (e.g., on-hook). If the subscriber requests to be called back, the automatic call-back device 160 may obtain information from the subscriber such as, for example, how the subscriber would like to be contacted (e.g., via a specified telephone number or pager as a call-back device) and an identification of the called party (i.e., by the called party's name, "David", for example). When the called party's telephone station 125 goes on-hook, the automatic call-back device 160 contacts the subscriber via the selected method and informs the subscriber that "David" is available for a call, for example.

While FIG. 1 shows the automatic call-back device 160 as a centralized unit, the automatic call-back device 160 may be distributed throughout the telephone network 155. When distributed, the local exchange carriers 115, 120, 130, 140 and 150 serve as control units of the automatic call-back device 160 performing all of its functions. For the following description, a distributed automatic call-back device 160 is assumed for ease of discussion.

Figure 2:
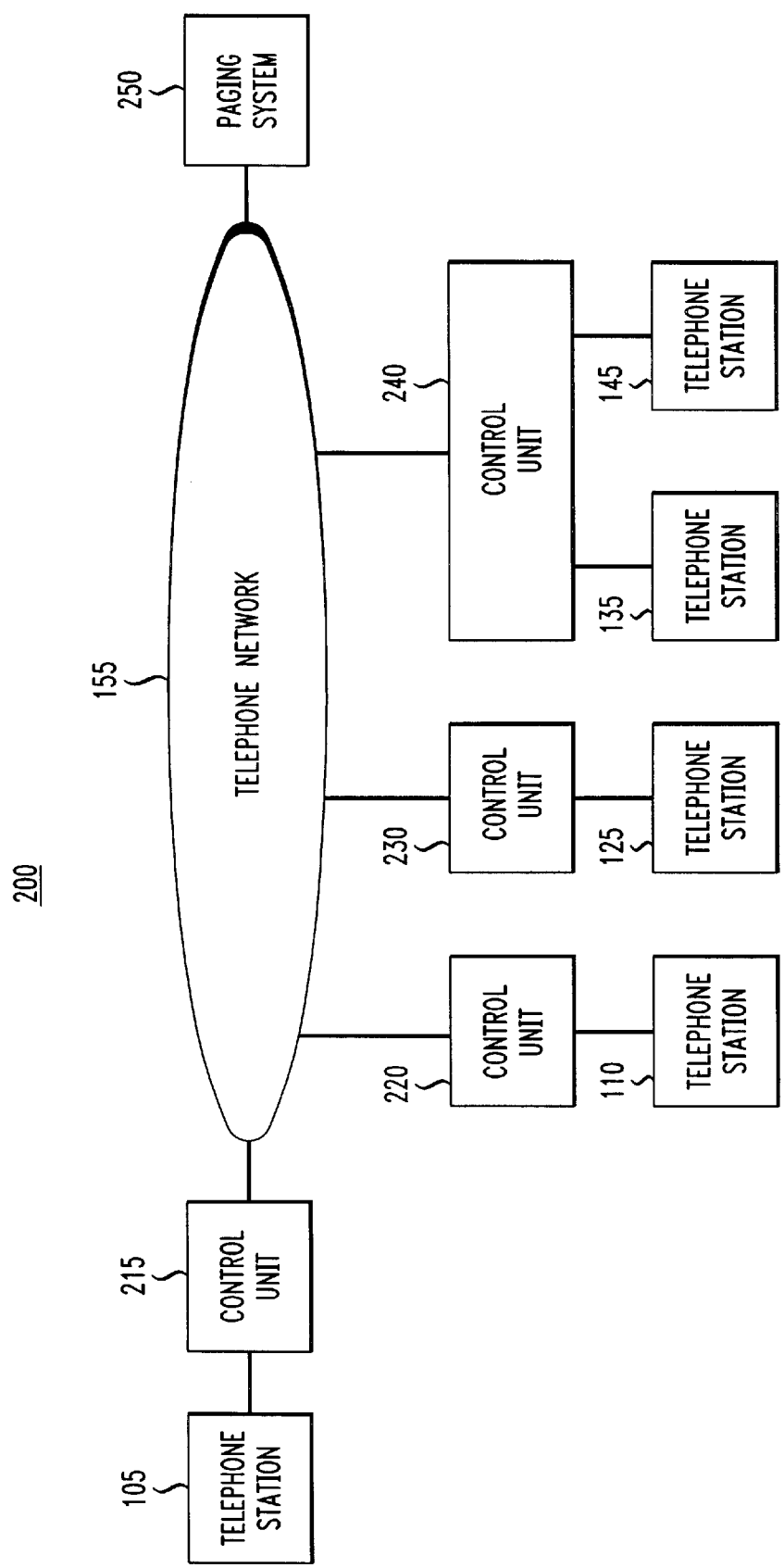
FIG. 2 is an exemplary block diagram of a distributed automatic call-back system.

FIG. 2 shows an exemplary block diagram of a distributed automatic call-back system 200. Telephone network 155 is connected to telephone stations 105, 110, 125, 135, and 145 via control units 215, 220, 230, and 240, respectively. The control units 215, 220, 230, and 240 interface with the telephone network 155 and serve as control units of the automatic call-back device 160 performing all of its functions. For ease of discussion, the control units 215, 220, 230, and 240: 1) are assumed to be similar in structure; 2) may handle more than one telephone station; and 3) include a database similar to database 165 as an internal or external memory. When external, the database may be centralized even if the automatic call-back device is distributed. The database, whether distributed or centralized, is referred to as the database 165. The telephone network 155 is also coupled to the paging system 250 which provides broadcasting capabilities to wirelessly communicate with portable communication devices.

When a first subscriber, using telephone station 105, calls a called party at the telephone station 125, the call is routed through the caller's control unit 215, telephone network 155, and the called party's control unit 230. If the control unit 230 determines that the called party's telephone station 125 is busy, the control unit 230 notifies the first subscriber's control unit 215 and then the first subscriber's control unit 215 retrieves the first subscriber's profile information from its database 165 and asks the subscriber whether a call-back is desired. If the first subscriber desires that a call-back be made, the control unit 215 prompts and receives information from the first subscriber, generates call-back information based on the information received from the first subscriber and information in the first subscriber's profile, and sends the call-back information to the control unit 230. The control unit 230 stores the call-back information in a call-back list in the database 165 that corresponds to the called party's telephone station 125 and monitors the telephone station 125 to determine whether the telephone station 125 is no longer busy.

While monitoring the telephone station 125, the control unit 230 starts a time-to-live timer value which is specified in the first subscriber's profile information and included in the call-back information corresponding to the first subscriber. If the time-to-live timer value expires (e.g., an interval timer expires), the control unit 230 deletes the first subscriber's call-back information from the called party's call-back list automatically terminating the call-back. The control unit 230 may notify the first subscriber that the call-back has been terminated, based on the first subscriber's instruction in the call-back information.

For example, the subscriber may set the call-back time-to-live value 420 to thirty minutes, so that if the called party's telephone station does not become available within thirty minutes, the subscriber will automatically drop off the called party's call-back list. The subscriber may also require that the automatic call-back device 160 make a maximum of ten tries at contacting the subscriber when the called party has been determined to be no longer busy, for example.

If a second subscriber at telephone station 110 calls the called party at telephone station 125 while telephone station 125 is still busy, the control unit 220 corresponding to the second subscriber sends the second subscriber's call-back information to the control unit 230. The control unit 230 adds the second subscriber's information to the called party's call-back list.

Once control unit 230 determines that the telephone station 125 is no longer busy, and that the first subscriber's call-back information specified telephone station 105 as a call-back device, the control unit 230 calls the first subscriber at telephone station 105 through control unit 215 and asks whether the first subscriber would like to be connected to the called party at telephone station 125. If the first subscriber wants to be connected, the control unit 230 connects the first subscriber at telephone station 105 to the called party at telephone station 125. However, if the first subscriber at telephone station 105 does not want to be connected or the control unit 230 determines that the first subscriber at telephone station 105 does not answer or is busy, the control unit 230 contacts the next subscriber on the called party's call-back list such as the second subscriber, for example. The control unit 230 moves the first subscriber to another position on the call-back list such as to the next highest priority in the call-back list.

Once telephone station 125 is determined to be no longer busy and the control unit 230 has been unable to contact the first subscriber via the first subscriber's preferred method, the control unit 230 decrements a counter which is set to a predetermined time. Once the predetermine time expires, the control unit 230 will remove the first subscriber from the call-back list.

The first subscriber at telephone station 105 may have called several called parties whose telephone stations were busy. The control unit 220–240 of the first called party determined to be available (i.e., no longer busy) will then contact the first subscriber. For example, the first subscriber at telephone station 105 attempts to contact called parties at telephone station 125, 135, and 145, and all three telephone stations 125–145 are determined to be busy. If the control unit 240 later determines that telephone station 145 is no longer busy, the control unit 240 will contact the first subscriber at telephone station 105. Once the control units 230 and 240 determine that the first subscriber has completed the call with the called party at telephone station 145 and the remaining called parties at telephone stations 125 and 135 are determined to be available (i.e., no longer busy), the control unit 230 or 240 corresponding to the telephone station 125 or 135 that is available, contacts the first subscriber, for example.

FIG. 3 is a block diagram of the control unit 215 which is representative all of the control units 220, 230 or 240 of the automatic call-back device 160. The control unit 215 may include a controller 330, a memory 320, a telephone network interface 350, a telephone interface 340, a paging system interface 310, and a database interface 360.

When the first subscriber calls a called party from telephone station 105, the call is received by the controller 330 through the telephone station interface 340. The controller 330 receives a signal from control unit 230 regarding whether the called party's telephone station 125 is busy. If the called party's telephone station 125 is busy, the controller 330 retrieves the first subscriber's profile information from either the memory 320 or an external database through the database interface 360. The controller 330 also solicits additional information from the first subscriber via the telephone station interface 340 and generates the first subscriber's call-back information. The controller 330 sends the first subscriber's call-back information to the called party's control unit 230.

After the controller 330' of the control unit 230 receives the first subscriber's call-back information, the controller 330' checks database 165 stored either in the memory 320' or an external database accessed through database interface 360' to determine whether the called party's call-back list exists. If the called party's call-back list exists, the controller 330' retrieves the call-back list and adds the first subscriber's call-back information to the first party's call-back list. The call-back list is then re-stored in the database 165. If the called party's call-back list does not currently exist, the controller 330' generates a new call-back list, includes the first subscriber's call-back information in the call-back list and stores the call-back list in the database 165.

The controller 330' monitors the called party's telephone station 125 through telephone station interface 340' to determine whether the called party's telephone station 125 is no longer busy. The controller 330' also continually decrements the first subscriber's time-to-live timer value which is specified in the first subscriber profile information and included in the first subscriber's call-back information. If the telephone station 125 remains busy beyond the prescribed time-to-live timer value, the controller 330' deletes the first subscriber's call-back information from the called party's call-back list and notifies the first subscriber that the call-back has been terminated if requested by the first subscriber.

If a second subscriber at telephone station 110 attempts to contact the called party at telephone station 125 while telephone station 125 is still busy, the controller 330" of the control unit 220 sends the second subscriber's call-back information to the controller 330' of the control unit 230. The controller 330' then adds the second subscriber's information to the called party's call-back list. This process continues for additional subscribers as long as the called party's telephone station 125 remains busy.

If the controller 330' determines that the called party's telephone station 125 is no longer busy, the controller 330' retrieves the called party's call-back list and begins a call-back process starting with the subscriber that called earliest. For the earliest subscriber, the controller 330' retrieves the earliest subscriber's call-back information and proceeds to contact the earliest subscriber via the requested call-back method. If the earliest subscriber is the first subscriber and has requested to be contacted at telephone station 105, for example, the controller 330' notifies the first subscriber at telephone station 105 via telephone network interface 350' and asks if the first subscriber would like to complete the call to the called party. Alternatively, the controller 330' may determine that the first subscriber has requested to be paged as the preferred call-back method. The controller 330' will then signal the paging system 250 through the paging system interface 310' to page the first subscriber.

However, if the first subscriber at telephone station 105 does not want to be connected or the controller 330' of control unit 230 determines that telephone station 105 is not answered or is busy, the controller 330' contacts a next subscriber in the called party's call-back list. The first subscriber's call-back information is moved to another location in the call-back list, such as the next highest priority on the called party's call-back list, for example.

FIG. 4 illustrates an example of a subscriber profile 400 which may be stored in the database 165. For example, the subscriber profile 400 may include: 1) the subscriber ID number 410; 2) a call-back time-to-live value 420, which is the time limit that the subscriber will wait for a call-back; 3) the number of tries if the subscriber is busy 430, which is the number of times the automatic call-back device 160 will attempt to contact the subscriber once the called party's telephone station is determined to be no longer busy; and 4) the subscriber's preferred call-back methods 440, which are methods by which the subscriber wishes to be notified when the called party's station is no longer busy, such as by pager, telephone, etc. The call-back methods 440 may be preselected by the subscriber, included in the subscriber profile 400, and forwarded to the called party's control unit 230 as part of the subscriber's call-back information for inclusion in the called party's call-back list. However, at the time of the call-back request, the subscriber may specify a call-back method which is not included in the subscriber profile 400, such as a pay phone, etc. In this manner, a subscriber can give the automatic call-back device 160 several customized options so that the subscriber may be timely and efficiently notified that a called party's telephone station is no longer busy.

FIG. 5 illustrates an example of the called party's call-back list 500 which may be stored in the database 165. For example, the called party's call-back list 500 may include the subscriber's ID number 520, the subscriber's preferred call-back method 530, the subscriber's time-to-live value 540, and the subscriber's requested number of tries if the subscriber is determined to be busy when the called party has been determined to be no longer busy 550.

The information on the called party's call-back list 500 is kept in sequential order according to the time that the subscribers attempted to contact the called party, for example. The list then operates according to a first-in, first-out method. However, if the first (or earliest) subscriber is determined to be busy, for example, the controller 330 will attempt to contact the next highest priority subscriber on the call-back list. The subscriber who cannot be reached, will then assume the next highest priority on the call-back list, for example, until the subscriber is contacted or the number of tries 550 is reached and the subscriber is removed from the call-back list 500. The controller 330, however, may use other priority schemes to determine the next caller in the call-back list.

Figure 6:
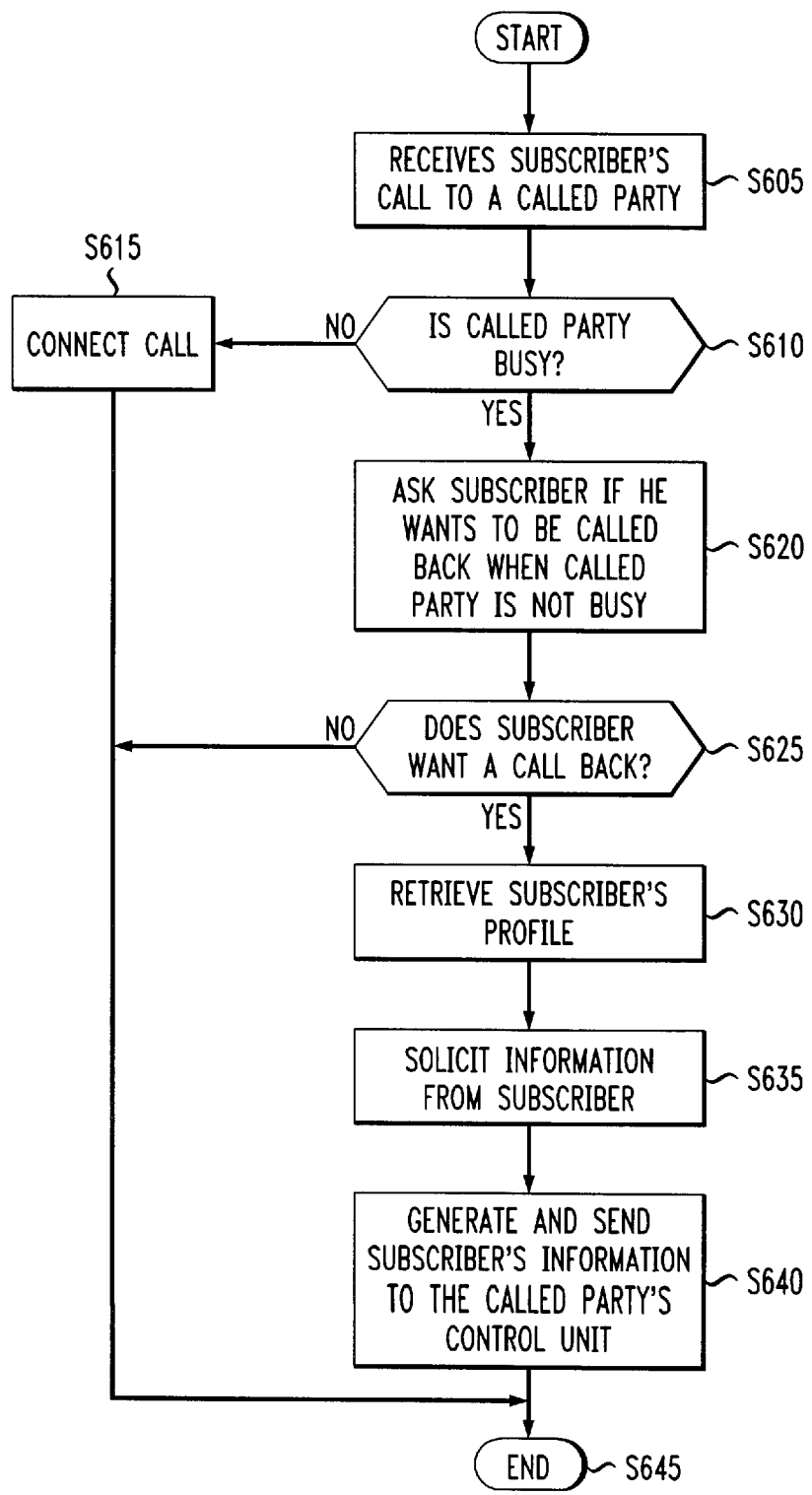
FIG. 6 is a flowchart of the automatic call-back device process.

FIG. 6 is a flowchart describing the automatic call-back system process at the subscriber's control unit 215. At step S605, the controller 330 receives the subscriber's call to a called party and goes to step S610. At step S610, if the controller 330 determines that the called party is not busy, the controller 330 goes to step S615; otherwise the controller goes to step S620. At step S615, the controller 330 connects the subscriber to the called party and goes to step S645 and ends. At step S620, the controller 330 prompts the subscriber if he wants to be called back when the called party is no longer busy, and goes to step S625. At step S625, if the subscriber does not want a call-back, the controller 330 jumps to step S645 and ends; otherwise the controller 330 goes to step S630.

At step S630, the controller 330 retrieves the subscriber's profile information from the memory 320 or the external database through database interface 360 and goes to step S635. At step S635, the controller 330 solicits additional information from the subscriber and goes to step S640. At step S640, the controller 330 generates the subscriber's call-back information and sends the subscriber's call-back information to the called party's control unit controller 330', and goes to step S645 and ends.

Figure 7:
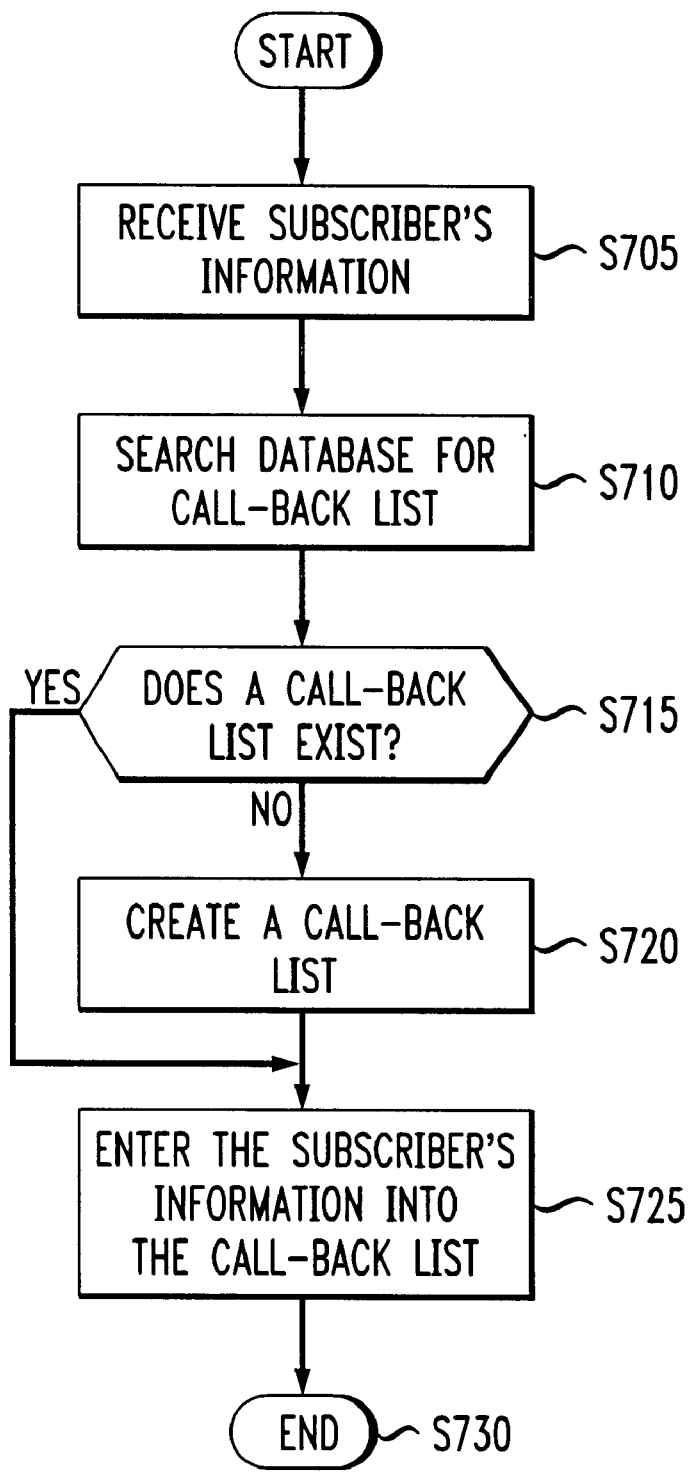
FIG. 7 is a flowchart of a process of the automatic call-back device for adding the subscriber to the called party's call-back list.

FIG. 7 is a flowchart describing the automatic call-back device process in control unit 230 for a called party. At step S705, the called party's control unit controller 330' receives the subscriber's call-back information from the subscriber's control unit controller 330 and goes to step S710. At step S710, the controller 330' searches the database 165 for an existing call-back list 500 for the called party and goes to step S715. At step S715, if a call-back list 500 does not exist, the controller 330' goes to step S720; otherwise the controller 330' goes to step S725. At step S720, the controller 330' creates a call-back list 500 and then goes to step S725. At step S725, the controller 330 enters the subscriber's call-back information into the call-back list 500, returns the call-back list 500 into the database 165, goes to step S730 and ends.

Figure 8:
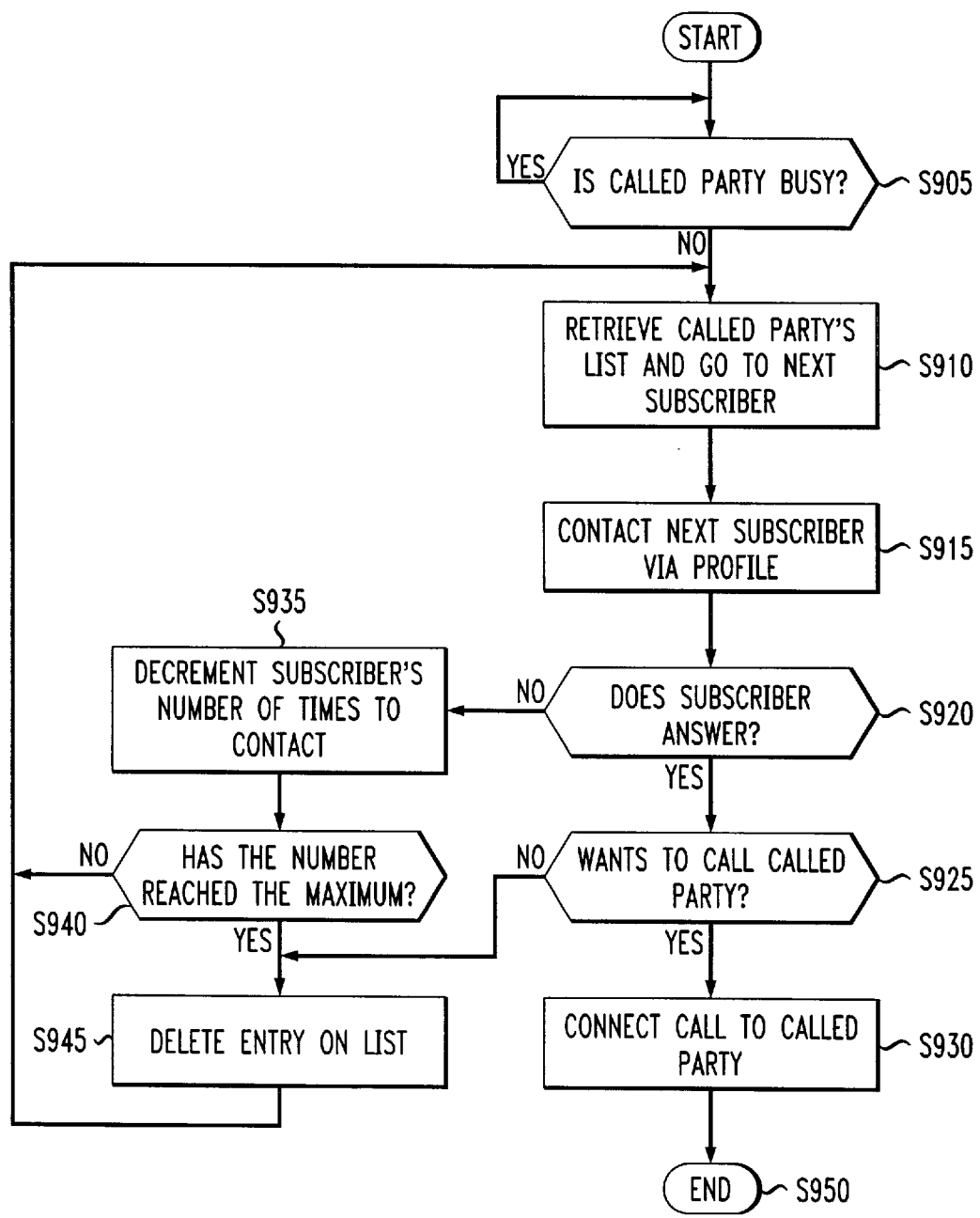
FIG. 8 is a flowchart of a process of the automatic call-back device for monitoring the called party.

FIG. 8 is a flowchart describing the called party's control unit 230 call monitoring process. At step S905, the controller 330' monitors the called party's telephone station 125. If telephone station 125 is busy, the controller 330 returns to step S905; otherwise the controller 330' goes to step S910. At step S910, the controller 330' retrieves the called party's call-back list 500 from the database 165, chooses the next highest priority subscriber as the contact subscriber and goes to step S915. At step S915, the controller 330' contacts the contact subscriber via the contact subscriber's preferred call-back method in block 530 of the call-back list 500 and goes to step S920.

At step S920, if the contact subscriber answers the call, the controller 330' goes to step S925. At step S930, the controller 330' determines whether the contact subscriber wants to call the called party. If the called party wants to call the called party, the controller 330' goes to step S930; otherwise the controller 330' goes to step S945. At step S930, the controller 330' calls the called party and connects the contact subscriber to the called party and goes to step S950 and ends. If the contact subscriber does not answer, the controller 330' goes to step S935. At step S935, the controller 330' decrements a value that corresponds to a number of attempts to contact the contact subscriber as specified in the contact subscriber's call-back information, and goes to step S940. At step S940, if the controller 330' determines that the number of attempts to contact the contact subscriber has reached a maximum, the controller 330' goes to step S945 and deletes the contact subscriber's call-back information from the call-back list 500, and then jumps to step S910 to retrieve another contact subscriber on the called party's call-back list 500. If the controller 330' determines that the subscriber's maximum number of attempts to contact has not been reached, the controller 330' goes back to step S915 and continues to contact the subscriber.

The automatic call-back device 160 may be implemented on a general purpose computer. However, the automatic call-back device 160 may also be implemented using a special purpose computer, a microprocessor or microcontroller and peripheral integrated circuit elements, and Application Specific Integrated Circuits (ASIC) or other integrated circuits, a hardwired electronic or logic circuit, such as a discrete element circuit, a programmable logic device such as a PLD, PLA, FGPA, or PAL, or the like. Furthermore, the functions of the automatic call-back device 160 may be performed by a standalone unit or distributed throughout the a communications system. In general, any device performing the functions of an automatic call-back device 160, as described herein, may be used.

In addition, while callers have been represented above as automatic call-back system subscribers, alternatively, an automatic call-back system operator may bill the called parties, both the callers and the called parties, or neither the callers and called parties, as automatic call-back system subscribers.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention as described in the following claims.

What is claimed is:

1. A method for operating a call-back system in a telecommunications network, comprising:

receiving a call from a calling subscriber directed to a telephone station of a called party;

determining in a first control unit associated with the calling subscriber whether the telephone station of the called party is busy;

in response to a determinaton that the telephone station is busy, the first control unit retrieving a profile associated with the calling subscriber and soliciting additional information from the calling subscriber;

generating call-back information based on the profile and the additional information; and sending the call-back information to a second control unit associated with the called party.

2. The method of claim 1, wherein the additional information includes a preferred call-back method.

3. The method of claim 2, further comprising:

calling back the calling subscriber when the telephone station becomes not-busy based on the preferred call-back method.

4. The method of claim 3, wherein the call-back method includes querying the calling subscriber whether the calling subscriber desires to be connected to the called party, and if the calling subscriber desires to be connected to the called party, connecting the calling subscriber and the called party in a call.

5. The method of claim 3, further comprising:

incorporating the call-back information in a call-back list; and storing the call-back list in a database.

6. The method of claim 5, further comprising:

retrieving the call-back information from the database;

selecting options based on the call-back information; and combining the selected options to modify the call-back information.

7. The method of claim 5, further comprising:

searching for a call-back list that corresponds to the called party in the database;

creating a new call-back list if the call-back list is not found;

adding the call-back information to the call-back list if the call-back list is found; and storing the call-back list in the database.

8. The method of claim 7, wherein the call-back method includes making a telephone call or paging.

9. The method of claim 7, further comprising deleting the call-back information if a predetermined time-limit expires.

10. The method of claim 5, further comprising:

receiving a call directed to the telephone station of the called party from another calling subscriber when the telephone station is busy;

generating call-back information of the another calling subscriber; and adding the call-back information of the another calling subscriber to the call-back list.

11. The method of claim 10, wherein the calling back step comprises:

retrieving the call-back list from the database;

contacting a first calling subscriber based on a first call-back information; and contacting a second calling subscriber based on a second call-back information if the first calling subscriber does not answer.

12. The method of claim 11, wherein call-back information in the call-back list is arranged in an order according to a predetermined scheme.

13. The method of claim 12, wherein the predetermined scheme orders call-back information in the call-back list corresponding to a first calling subscriber before call-back information corresponding to a second calling subscriber who called later in time than the first calling subscriber.

14. A call-back system operating in a telecommunications network, comprising:

a database;

a first control unit coupled to a telephone station of a called party; and a second control unit coupled to the database, the second control unit being associated with a calling subscriber who initiates a call directed to the telephone station and in response to a determination that the telephone station is busy, (a) retrieves a profile associated with the calling subscriber and solicits additional information from the calling subscriber, (b) generates call-back information based on the profile and the additional information, and (c) sends the call-back information to the first control unit.

15. The system of claim 14, wherein the additional information includes a preferred call-back method.

16. The system of claim 15, wherein the first control unit (d) calls back the calling subscriber when the telephone station becomes not-busy based on the preferred call-back method.

17. The system of claim 16, wherein the call-back method includes querying the calling subscriber whether the calling subscriber desires to be connected to the called party, and if the calling subscriber desires to be connected to the called party, connecting the calling subscriber and the called party in a call.

18. The system of claim 16, wherein the second control unit (e) incorporates the call-back information in a call-back list, and (f) stores the call-back list in the database.

19. The system of claim 18, wherein the second control unit (g) retrieves the call-back information from the database, (h) selects options based on the call-back information, and (i) combines the selected options to modify the call-back information.

20. The system of claim 18, wherein the second control unit (g) searches for a call-back list that corresponds to the called party in the database and creates a new call-back list if the call-back list is not found, (h) adds the call-back information to the call-back list if the call-back list is found, and (i) stores the call-back list in the database.

21. The system of claim 20, wherein the call-back method includes making a telephone call or paging.

22. The system of claim 20, wherein the second control unit deletes the call-back information if a predetermined time-limit expires.

23. The system of claim 18, wherein the second control unit (g) receives a call directed to the telephone station of the called party from another calling subscriber when the telephone station is busy, (h) generates call-back information of the another calling subscriber, and (i) adds the call-back of the another calling subscriber to the call-back list.

24. The system of claim 23, wherein the second control unit retrieves the call-back list from the database, contacts a first calling subscriber based on a first call-back information, and contacts a second calling subscriber based on a second call-back information if the first calling subscriber does not answer.

25. The system of claim 24, wherein call-back information in the call-back list is arranged in an order according to a predetermined scheme.

26. The system of claim 25, wherein the predetermined scheme orders call-back information in the call-back list corresponding to a first calling subscriber before call-back information corresponding to a second calling subscriber who called later in time than the first calling subscriber.

* * * * *